United States Patent Office 3,773,799
Patented Nov. 20, 1973

3,773,799
DIGLYCIDYL ETHER OF 4-METHYLOL RESORCINOL
John J. Schmid, Panama City, Fla., assignor to the United States of America as represented by the Secretary of the Army
No Drawing. Filed July 6, 1971, Ser. No. 160,149
Int. Cl. C07d 1/18
U.S. Cl. 260—348 R          1 Claim

ABSTRACT OF THE DISCLOSURE

High yields of rapid curing epoxy resins derived from 1,3-diphenols and having the formula:

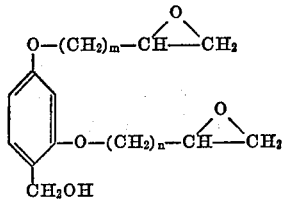

wherein $m$ and $n$ each have values of at least 1. These resins can be cured at room temperature and can be used for a variety of industrial applications including adhesives, protective coatings and/or encapsulants for heat-sensitive electrical components used, for example, in the manufacture of fuzes.

---

The invention described herein may be manufactured, used and licensed by or for the United States Government for governmental purposes with the payment to us of any royalty thereon.

BRIEF SUMMARY OF THE INVENTION

This invention relates to derivatives of 4-methylol resorcinol of the formula:

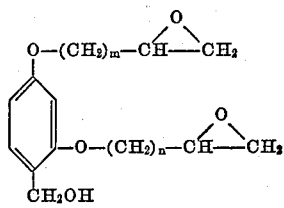

wherein both $m$ and $n$ each have values of at least 1, and to curable compositions and cured products based thereon. More particularly, this invention relates to diglycidyl ethers of 4-methylol resorcinol which can be rapidly cured at room temperature to form high yields of the cured product which can be used for a variety of industrial applications including adhesives, protective coatings and/or encapsulants for heat-sensitive electrical components used, for example, in the manufacture of fuzes.

BACKGROUND OF THE INVENTION

Epoxy resins have been extensively employed in various industrial applications as potting agents, encapsulants, adhesives and protective coatings, particularly in the production of fuzes. They exhibit high mechanical strength and good electrical insulating ability thus making them ideal for protecting delicate electronic components. However, most resin systems have been found to cure very slowly or incompletely at room temperature, resulting in relatively long production times. Elevated temperatures are frequently required for rapid and complete cures but such elevated temperatures cannot be used where heat-sensitive electronic components are being employed. The curing agents available for low temperature rapid cures (i.e., Lewis acids) result in the formation of a cured product having undesirable physical properties. The use of a hardener to cure the resin rapidly, also usually results in the impairment of some desirable physical property of the resin. For example, a system cured with one of the available curing agents or hardeners often results in the formation of an epoxy resin which is too brittle, has a low chemical resistance and/or a high rate of shrinkage. Since the rapid curing of epoxy resin systems at ambient temperatures is usually a function of the curing agent or hardener and not of the resin activity, the properties of the fast curing systems are limited by the curing agent or hardener employed.

If an epoxy resin could be modified to enhance reactivity toward a relatively slow reacting curing agent, a much greater flexibility in the formulating of epoxy resin systems would be available. Thus, there has been a great need for a rapid-curing epoxy resin which can be cured rapidly at room temperatures and which avoids many of the drawbacks of the epoxy resins used heretofore. Such a resin would have a wide variety of industrial applications including its use as an adhesive for the rapid bonding of small heat-sensitive electrical components.

OBJECTS OF THE INVENTION

Specifically, it is the primary object of the invention to provide a highly reactive epoxy prepolymer which can be rapidly cured at room temperature to form a cured product that can be used for a variety of industrial applications.

Consistent with this primary object, it is a further object hereof to provide rapidly cured epoxy resins that can be employed as potting agents, encapsulants, adhesives and protective coatings for delicate electronic components.

Still another, most important object of this invention is to provide a highly reactive prepolymer having a sufficiently low viscosity to enable incorporation of inert fillers in an amount sufficient to control the exothermic temperature inherent in curing said prepolymer.

A further object of this invention is to provide a rapidly curable epoxy resin wherein the rate of cure is due to the reactivity of the prepolymer rather than the curing agent.

A still further object of this invention is to provide a rapidly curing epoxy resin which can be produced in high yields by means of a simple and efficient process that is amenable to large scale production.

The invention will be better understood and objects other than those set forth above will become apparent after reading the following detailed description of preferred, yet illustrative, embodiments hereof.

DETAILED DESCRIPTION OF THE INVENTION

It has now been discovered that these and other objects may be accomplished by employing a novel prepolymer of the formula:

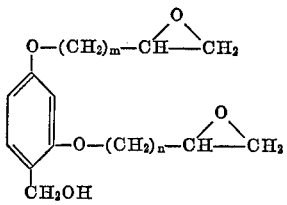

wherein both $m$ and $n$ have values of at least 1, and wherein the rapid curing is a function of the prepolymer rather than the curing agent employed.

The compound of this invention possesses a hydroxyl group proximate to the epoxy groups to enhance the reactivity of the epoxide rings, both intramolecularly and intermolecularly. The hydroxyl group exerts an anchimeric increase in the rate of the epoxide ring opening thereby accelerating the rate of cure through hydrogen bonding with the oxygen of the epoxide ring.

While it is possible for both $m$ and $n$ to have values greater than 1, it should be pointed out that best results are obtained when both $m$ and $n$ each are equal to 1. When $m$ and $n$ are each greater than 1, the rate of cure of the resin will decrease somewhat. Likewise, the substitution of an ethylol or propylol group for the methylol group will also cause the rate of cure to be decreased somewhat.

Preparation of compounds falling within the scope of the above formula is conveniently accomplished by a three-step, high-yield sequence starting with resorcinol. The synthesis of the resin monomer is as follows:

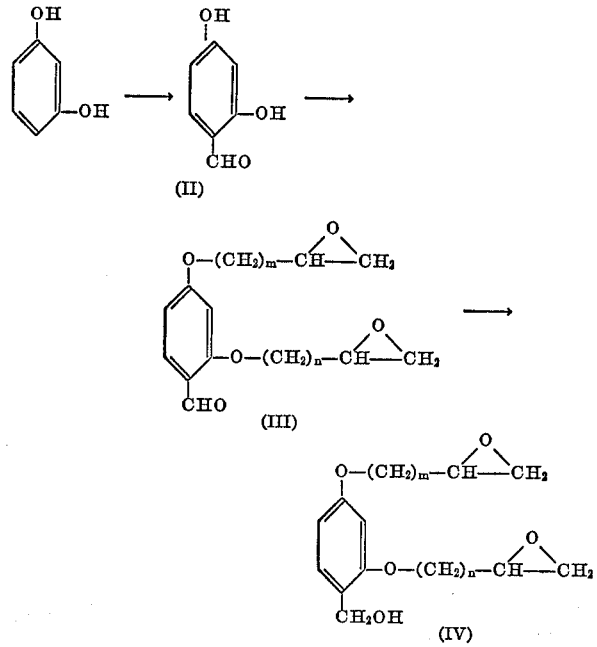

Intermediate compound II, β-resorcylaldehyde, is prepared from the resorcinol starting material I by a modified Gatterman reaction. Carefully controlled condensation of this material with epichlorohydrin results in the formation of the ether intermediate III. Subsequent conversion to the final product may be attained by either borohydride reduction or catalytic hydrogenation.

A particularly preferred resin monomer used in the practice of this invention is the diglycidyl ether of 4-methylol resorcinol. This compound is prepared by first formylating the resorcinol by means of a modified Gatterman reaction. See Adams, R., and Levine, I., J. Am. Chem. Soc., 45, 2373 (1923).

In a 500-ml. three-neck round-bottom flask fitted with a mechanical stirrer, gas "sparge," and condenser, were placed 20 grams (0.18 mole) of resorcinol I, 27.2 grams (0.55 mole) of sodium cyanide, 200 ml. of anhydrous chloroform and 25 ml. of anhydrous ether. Dry HCl gas was bubbled into the solution with stirring for 1.5 hours until the reaction mixture turned pink and a gummy solid settled to the bottom of the flask. The residual hydrogen cyanide produced was destroyed by passing it through a 25 percent aqueous sulfuric acid trap and then a 25 percent aqueous sodium hydroxide trap. The solvent was decanted and the residue was dissolved in 100 ml. of water and boiled for 5 minutes. After cooling the resultant solution to room temperature, 12.4 grams of crude β-resorcylaldehyde (II) were collected by filtration. The mother liquor was allowed to stand overnight at room temperature and another 10.7 grams of product was obtained, giving a combined 23.1 grams (95 percent) of crude β-resorcylaldehyde (II). Crude II was then decolorized with activated charcoal and recrystallized from water to yield an off-white solid, melting point of 134–135° C. (lit. 135–136° C.); IR, 1650 cm.$^{-1}$ (—CHO), 3500–3700 cm.$^{-1}$ (—OH). This reaction is depicted as follows:

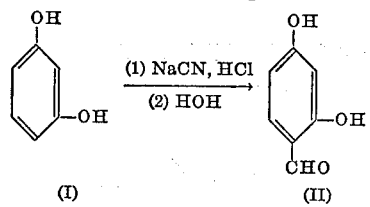

The diglycidyl ether of β-resorcylaldehyde (III) was obtained by condensing II with epichlorohydrin in the presence of a base.

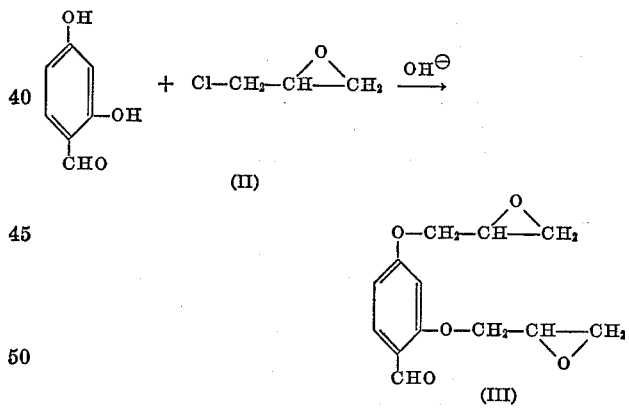

In a 1-l. three-neck round-bottom flask equipped with a mechanical stirrer, a Dean-Stark trap, and a condenser, were placed 30 grams (0.22 mloe) of II and 420 grams (5 mole) of epichlorohydrin. To this mixture, held at reflux, was added dropwise over a period of 3 hours a solution of 18 grams (0.45 mole) of sodium hydroxide in 27 ml. of water. The reaction mixture was then refluxed an additional 2.5 hours until 34.5 ml. (theoretical yield 34.8 ml.) of water had been collected in the Dean-Stark trap. Sodium chloride and a small amount of bright orange solid polymeric material were removed by filtration. The solvent was removed in vacuo to yield 53.6 grams of III as a yellow oil (viscosity 9 stokes) which slowly crystallized upon standing. Analytical thin layer chromatography revealed the crude product to be predominantly III (90 percent) along with a small amount of less soluble, more polar material (presumably higher homologs of resin III since no starting material was present). Pure III could be obtained by recrystallization from acetone or methanol, M.P. 74–77° C.; IR, 910 cm.$^{-1}$ (epoxide) 1675 cm.$^{-1}$ (CHO); NMR, τCDCl$_3$ 7.2–7 m. (4H), 6.8–6.5 m. (2H), 6.2–5.5 m. (4H), 3.4 m. (2H), 2.2 d. (2H), 0.5 d. (1H).

The intermediate III could be converted to the diglycidyl ether of 4-methylol resorcinol IV by either (A) catalytic hydrogenation or (B) reduction with sodium borohydride:

(A) Catalytic hydrogenation was accomplished in the following manner:

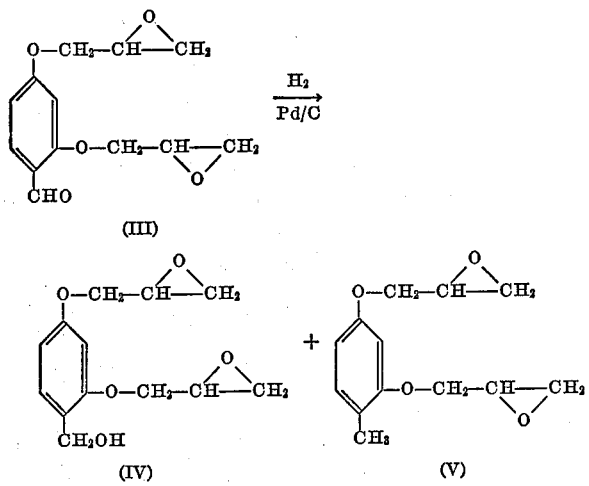

In a Paar Pressure Reaction Apparatus were placed 350 mg. (0.0014 mole) of III (purified, M.P. 74–77° C.) dissolved in 25 ml. of methanol and 1 mg. of 10 percent palladium-carbon catalyst. The reaction was allowed to proceed under 2–3 atm. of hydrogen with mechanical shaking. The reaction was essentially complete (no aldehyde absorption at 1675 cm.$^{-1}$) after 30 min. After filtering the catalyst the solvent was removed in vacuo to afford 345 mg. of the diglycidyl ether of 4-methylol resorcinol IV as a light yellow viscous oil. Analytical thin layer chromatography revealed a small amount (10–15 percent) of the hydrogenolysis product V had also been formed. A pure sample of IV (300 mg.) was obtained by preparative thin layer chromatography, IR, 3500–3700 cm.$^{-1}$ (OH), 910 cm.$^{-1}$ (epoxide); NMR, $\tau$CDCl$_3$ 7.5–7.0 m. (5H), 6.8–6.5 m. (2H), 5.8–4.6 m. (4H), 4.4 br. s. (2H), 3.5 m. (2H), 2.8 m. (1H); D$_2$O/CDCl$_3$ as above except 75–7.0 m. (4H), and the broad, two proton singlet at 4.4 sharpened considerably.

In carrying out the catalytic hydrogenation, care must be taken to minimize the further reduction of the methylol group to a methyl group as in compound V. This undesired side reaction can be held to a minimum by carefully following the reduction with infrared spectroscopy. It should be noted, however, that a small amount of the over-reduction product V is not expected to hinder the reactivity of the resin too much or impair physical properties since V is still a difunctional epoxy resin.

(B) Sodium borohydride is successfully employed to reduce the carbonyl group without affecting the epoxide group.

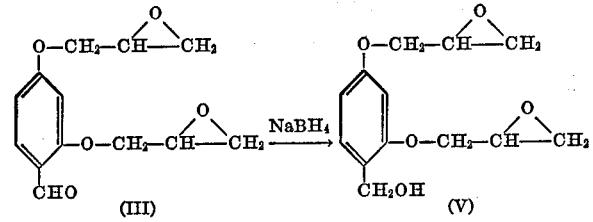

Best results are obtained when sodium borohydride is employed because most methods of reducing aldehydes result in the opening of the oxirane ring. In order to reduce the aldehyde group, sodium borohydride was added slowly to a solution of 20 grams (0.15 mole) of crude III in 100 ml. of methanol at 5° C., until the bright yellow color of III disappeared (about 20 min.). The reaction mixture was then acidified with dilute hydrochloric acid and extracted several times with chloroform. The combined chloroform extracts were washed with water and dried over anhydrous sodium sulfate. The removal of solvent in vacuo afforded crude IV as a light yellow oil (viscosity—218 stokes). Analytical thin layer chromatography revealed the product to be 85–90 percent IV in addition to the small amount of higher molecular weight material carried over from the epoxidation step. In either case, crude IV could be vacuum distilled to give a yellow liquid (viscosity—140 stokes), B.P. 273° C. at 0.6 mm.

The curing the epoxy monomers of this invention may be accomplished by the addition of any of the chemical materials known in the art for curing epoxide resins. Such materials are usually referred to as curing agents but at times are designated as activators or catalysts.

Suitable examples of the curing agents which may be employed to cure the epoxy monomers include those organic nitrogen compounds that cause the addition polymerization of the epoxy resin molecule. These curing agents include, various amines, e.g. aliphatic and aromatic primary and secondary amines, aliphatic and aromatic polyamines.

Suitable examples of aliphatic and aromatic primary and secondary amines include diethyleneaminopropylamine, polyamide resins, dibenzylamine, etc. A particularly preferred aliphatic primary amine is diethylenetriamine.

The curing agent is employed in at least catalytic amounts, that is, amounts sufficient to initiate the self-cure of the epoxy resin monomers of this invention. Generally, the curing agent is used in amount of from about 10 to about 20 parts by weight and preferably in a stoichiometric amount based on the weight of the epoxy resin monomer and the particular curing agent to be employed.

Inert fillers may also be added to the curable compositions of this invention which comprise the epoxy resin monomer and the curing agent. These fillers are incorporated into an epoxy resin in order to reduce the resin content and, more importantly, to reduce the exothermic heat of reaction. In this regard, it should be noted that due to the low viscosity of the resins of this invention, a sufficient amount of fillers may be incorporated into the cured resins of this invention to reduce the exothermic heat of reaction, thus enabling the resins of this invention to be used as adhesives, protective coatings and/or encapsulants for heat-sensitive electrical components. Examples of suitable fillers include sand, crushed shells, rocks, aluminum powder, steel powder, iron particles, quartz powder, titanium dioxide, asbestos, silica, calcium carbonate, graphite, black iron oxide, silicon dioxide, diatomaceous earth and the like. A particularly preferred filler is silica. The relative proportion of filler employed in the curable compositions of this invention may vary from 0 to about 50 percent by weight of the epoxy resin monomer depending upon the particle size of the filler and the desired viscosity of the filled resin.

Preliminary tests indicate that the diglycidyl ether of 4-methylol resorcinol reacts more rapidly at room temperature than similar high molecular weight resins and is less viscous when purified. The results of these tests are summarized in Table I, below.

In carrying out these tests, the rate of disappearance of the epoxide function during curing was easily followed by infrared spectroscopy. This was done most readily by periodically observing the decrease in intensity of the characteristic epoxide absorption band at 910 cm.$^{-1}$. Measurements were taken on a thin layer sample spread between two sodium chloride plates, thus excluding effects on the relative rates due to exotherms. Cure was considered complete at a given temperature when no further decrease in intensity of the absorption band could be observed.

In order to determine the relative reactivity of the new resin, the diglycidyl ether of 4-methylol resorcinol (IV) was cured with diethylenetriamine (DETA). This cure rate was compared with:

(A) A standard bisphenol A-type resin of the formula:

$$CH_2\text{---}CH\text{---}CH_2\text{---}O\text{---}\langle\text{ring}\rangle\text{---}C(CH_3)_2\text{---}\langle\text{ring}\rangle\text{---}O\text{---}CH_2\text{---}CH\text{---}CH_2$$

(VI)

(B) A modified bisphenol A resin with a methylol group proximate to an oxirane ring of the formula:

(VII)

(C) A standard resorcinol resin of the formula:

(VIII)

(D) And the diglycidyl ether of β-resorcylaldehyde (Formula III).

All the resins were cured with DETA and the amount of DETA used in each case was adjusted to compensate for differences in the epoxide equivalents in each resin. All runs were made at room temperature (25° C.).

The viscosity of each of the above resins was determined at room temperature with a series of Gardner Bubble Viscosity Tubes. A sample of the resin was introduced into a standard sample tube until the size of the bubble trapped air approximated that of the reference tubes. The tubes containing the samples and the reference liquids were inverted and the sample was matched to a reference liquid that had the same bubble rise times. If the sample viscosity lay between the viscosities of the two reference liquids, the bubble rise time was recorded for all three, and the viscosity of the sample calculated accordingly. In this manner the viscosity of each of the resins was determined and is recorded in Table I, below.

By referring to Table I, below, the preliminary tests show that the diglycidyl ether of 4-methylol resorcinol reacts more rapidly with primary amine curing agents than all currently available resins while still offering flexibility in formulating resin compositions. The tests show that resin IV reacts about 50 times faster than standard bisphenol A-type resin VI, 5 times faster than standard resorcinol based resin VIII, and 2-3 times faster than modified bisphenol A-type resin VII. The gelling within 7 minutes of thin sections of the intermediate diglycidyl ether of β-resorcylaldehyde (III) was due to the initial reaction of DETA with the carbonyl function along with some concurrent crosslinking through the epoxide functions. Upon mild heating (about 100° C.) the infrared spectrum revealed that the epoxide band at 910 cm.$^{-1}$ had completely disappeared and that a new band had appeared at 1670 cm.$^{-1}$ (imine absorption, —C=N—). These observations are consistent with the following mechanism for the reaction of the aldehyde moiety:

$$R\text{---}\langle\text{ring-}R\rangle\text{---}C(=O)H + H_2N\text{---}R_1 \longrightarrow R\text{---}\langle\text{ring-}R\rangle\text{---}CH(OH)\text{---}NH\text{---}R_1$$

$$\downarrow \text{HEAT}$$

$$R\text{---}\langle\text{ring-}R\rangle\text{---}C(H)=N\text{---}R_1 + H_2O$$

TABLE I.—CURE RATES AND VISCOSITIES OF EPOXY RESINS

| Resin | Phr. DETA curing agent | Viscosity in stokes | Cure time (by infrared) |
|---|---|---|---|
| Diglycidyl ether of 4-methylol resorcinol (IV). | 16.8 | {218 (crude)<br>{140 (distilled) | 35 minutes. |
| Modified bisphenol A (VII) | 9.7 | 196–2,000—solid.[a] | 75 minutes. |
| Standard bisphenol A (VI) | 11 | 142 | 25 hours.[b] |
| Standard resorcinol (VIII) | 15 | 3–4 [c] | 135 minutes. |
| Diglycidyl ether of β-resorcylaldehyde (III). | 20 | 9 [c] | 7 minutes.[d] |

[a] Initial samples of this resin were essentially solid, showing no flow at room temperature. A sample of an improved resin (reported to have the higher homologs removed) had a viscosity of about 190 stokes. A third sample, supposedly the same improved resin (was extremely viscous, possessing a viscosity of over 2,000 stokes.
[b] Additional heating at 75° C. for 1 hr. needed for complete cure.
[c] Being pure, high monomer content epoxy resins III and VIII are subject to crystallization upon standing at room temperature. Gentle heating at 60° C. is sufficient to reliquify the resins.
[d] Heating at 108° C. for 0.5 hr. needed for complete disappearance of epoxide absorption at 910 cm.$^{-1}$ in the infrared spectrum. Aldehyde absorption at 1,675 cm.$^{-1}$ had disappeared after 7 minutes.

It should be understood that the invention is not limited to the exact details of construction shown and described herein for obvious modifications will occur to persons skilled in the art. Accordingly, what is claimed is:

1. An epoxide capable of curing rapidly at ambient temperatures of the formula:

wherein $m$ and $n$ each have values equal to 1.

References Cited

UNITED STATES PATENTS 2,898,349   8/1959   Zuppinger et al.   260—348.6

FOREIGN PATENTS 743,647   1/1956   Great Britain.
785,930   11/1957   Great Britain.
1,006,848   10/1965   Great Britain.

NORMA S. MILESTONE, Primary Examiner

U.S. Cl. X.R.

260—47 EP, 47 EC